A. Brown,
Cage Trap.

No. 98,023. Patented Dec. 21, 1869.

Witnesses.
Alex F. Roberts
Jno. F. Brooks

Inventor.
Adam Brown
Per Munn & Co.
Attorneys

United States Patent Office.

ADAM BROWN, OF BRIDGEPORT, OREGON.

Letters Patent No. 98,023, dated December 21, 1869.

IMPROVEMENT IN ANIMAL-TRAP.

The Schedule referred to in these Letters Patent and making part of the same.

*To all whom it may concern:*

Be it known that I, ADAM BROWN, of Bridgeport, in the county of Polk, and State of Oregon, have invented a new and improved Animal-Trap; and I do hereby declare that the following is a full, clear, and exact description thereof, which will enable others skilled in the art to make and use the same, reference being had to the accompanying drawings, forming part of this specification.

This invention relates to improvements in traps for rats, squirrels, and other animals; and consists in the application, through an opening in the side of a box, of a detachable chute, extending some distance into the box, forming a passage thereinto, the walls of which are armed with spring-points, arranged, in the usual way, to permit ingress and prevent egress. The floor of the passage is elevated to form a chamber below for enclosing the bait, so that it cannot all be readily devoured.

The invention also comprises, in connection with the above, the application, to the side walls of the box, which is open at the top, of projecting sheets of metal, to prevent the animals from climbing out.

Similar letters of reference indicate corresponding parts.

Figure 1:
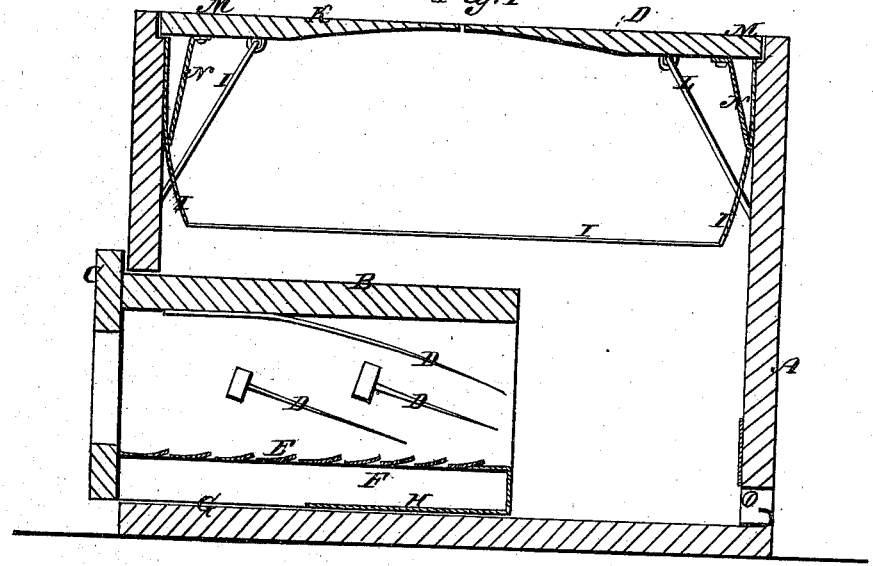
Figure 1 represents a sectional elevation of my improved trap.
Figure 2:
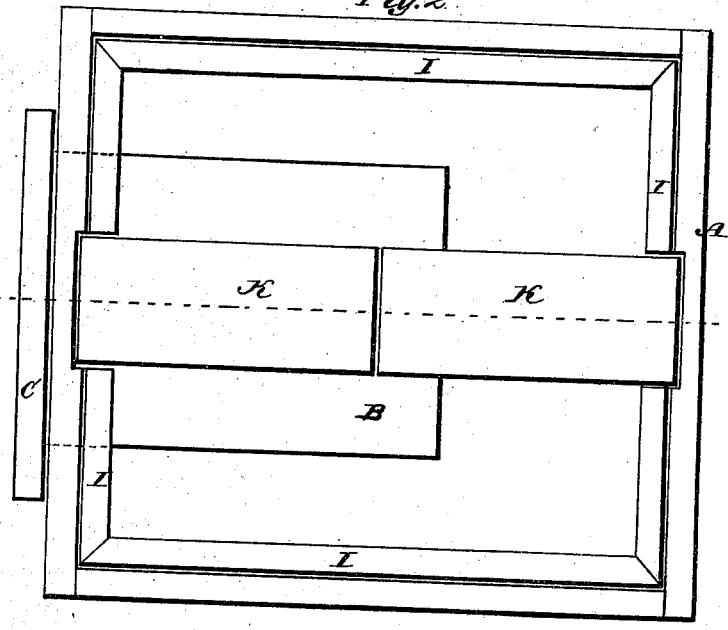
Figure 2 is a plan view of the same.

To any suitable strong box or case A, I attach, through a hole in the side, in a way to be readily attached or detached, a chute, B, projecting a suitable distance into the box from a front plate, C, having a suitable opening, the said chute forming a passage, enclosed on all sides, for the animals to pass into the box.

On the walls of this passage, I place spring-points, D, in the usual way of arranging them to admit the animals to pass in, but to prevent them from retreating.

The floor E, I make of perforated sheet-metal, and arrange it so as to form a chamber, F, below for enclosing the bait, which may be put in through the opening G, in a lower plate, H, by drawing the chute outward a short distance. The bait being thus enclosed, serves as well to entice the animals, and they are prevented from devouring it, so that it may remain for enticing numbers of them.

I represents sheets of tin or other thin metal attached to the inner walls of the box, and so shaped that the lower edges project from the surfaces of the said walls, in a way to prevent the animals from climbing out.

At the top I place two or more tilting-tables K, so pivoted on supports L, at some distance from the walls of the box, that the tables will support the animals until they go beyond the pivots, when they will suddenly tilt, and deliver them into the pit below.

These tables are heavier at the ends M, and they are provided with elastic cords or springs N, to return them after discharging the animals.

O represents a passage or opening through the wall, opposite the entrance, through the chute B, admitting light to the view of the animals entering, and calculated to give a less suspicious appearance to the trap when entering. It is armed with sheet-metal guards to prevent the animals from gnawing through.

It will be seen that these chutes B, being made separately, so as to be applied, as here shown, to any box, a good and serviceable trap may be readily provided by the application of one of the said chutes and the other devices, to any strong box, barrel, or other suitable case; also, that they may be readily detached from one box and placed on another.

Having thus described my invention,

I claim as new, and desire to secure by Letters Patent—

1. In combination with a box, barrel, or other suitable case, of a detachable chute, B, provided with spring-points D, perforated sheet-metal flooring E, and bait-chamber F, constructed and arranged to operate as herein shown and described, for the purpose specified.

2. The arrangement, in connection with the above, of the metal sheets I and tilting-tables K, all as specified.

ADAM BROWN.

Witnesses:
J. L. COLLINS,
J. I. THOMPSON.